April 2, 1957          H. WURZEL          2,787,166
RETAINING DEVICES
Filed Aug. 31, 1955

INVENTOR
HUGO WURZEL

BY *[signature]*

ATTORNEY

United States Patent Office 2,787,166
Patented Apr. 2, 1957

2,787,166

RETAINING DEVICES

Hugo Wurzel, New York, N. Y., assignor to Waldes Kohinoor, Inc., Long Island City, N. Y., a corporation of New York Application August 31, 1955, Serial No. 531,749

1 Claim. (Cl. 74—254)

This invention relates to improvements in retaining devices and, while not limited thereto, is more particularly directed to an improved retaining device for the connector pins of link chains of the type used as driving chains and the like.

As is well known, such connector pins are spaced definite distances apart and serve to pivotally connect the adjacent links of the chain, and also, in certain types of link chains, to connect the inner and outer bars of the individual links. When the connector pins have simple unheaded form or are headed at one end only a problem arises in securing the pins against dropping out of the holes provided in the links or link bars in which the pins are received. While various solutions for this problem have been offered, principally the use of conventional open spring retaining rings seating in grooves provided in the pins and which serve as artificial shoulders preventing axial pin movement, such have not proved practical because they introduced difficulties in assembly.

Stated broadly, an object of the invention is the provision of a simple, easy-to-handle-and-assemble, yet highly effective retaining device for the connector pins employed in chain link construction.

More particularly, an object of the invention is the provision of a retainer device for the connector pins of link chains so constructed and arranged that it is effective on two adjacent connector pins of the chain and can be assembled on both said adjacent pins simultaneously by the simple operation of pushing the device transversely of the pins into cooperating engagement therewith.

Another object of the invention is the provision of a simple and easy-to-handle-and-assemble bar type retaining device for the connector pins of link chains, which is capable of effectively securing two adjacent connecting pins against axial separation from the links which they interconnect and/or from the link bars making up said links.

Yet another object of the invention is the provision of a bar-type retaining device functioning as aforesaid and which is characterized by an elongated body and ends shaped to the form of spring jaws which are adapted to cooperate with rigid edges on the body of the bar serving as fixed jaws, wherein the associated jaws at each end of the bar are so related with respect to one another as to be capable of securing with spring pressure to the bottom of a groove provided in the connector pins in manner similar to an open spring retaining ring, and wherein the bar is provided with side edge openings extending to said cooperating jaws, which openings are spaced a distance corresponding to the distance between two adjacent pins of the chain having conventional ring-receiving grooves, whereby the retaining device may be assembled to the chain simply by disposing it with its side edge openings in registry with the grooves of two adjacent connector pins and thereupon pressing the device laterally so that the associated jaws at the ends of the retaining device secure to the bottoms of the pin grooves.

The above and other objects and advantages of a retaining device according to the invention will appear from the following detailed description thereof, in which reference is had to the accompanying drawing, wherein.

As forecast above, a retaining device according to the invention, while not limited thereto, is designed for and has special utility in securing the connector pins of link chains against separation from the links which they interconnect and/or from the link bars making up said links. Illustratively, such a link chain may comprise a plurality of spaced main links 10 which are connected by connecting links 12, it being understood that the designations "main links" and "connecting links" have been employed without any special significance as to the relative predominance of said links but, rather, for the purpose of simple disclosure.

Figure 3:
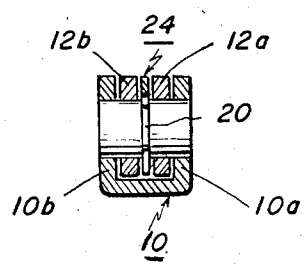
Fig. 3 is a section taken along line 3—3 of Fig. 2.

Each of said main links is pivotally connected at its ends to the connecting links 12 by connector pins 14a, 14b, the illustrated chain being of the type employing non-headed connector pins so that in the absence of means for securing said pins in place they are likely to move axially from the holes 16 provided for their reception in the link bars making up said links. As seen in Fig. 3, the inner and outer link bars 10a, 10b of the main links 10 are integral, as results from the main links having U or channel section, whereas the inner and outer link bars 12a, 12b of the connecting links 12 are fashioned as separate link bars which are related in the assembly of the chain. It will also be seen and understood that the aforesaid connector pins 14a, 14b are spaced a fixed distance apart, and that each said pin is provided intermediate its ends with a groove 20 of the type previously employed to seat an open spring retaining ring serving to secure the pin against unwanted axial separation as aforesaid.

Figure 1:
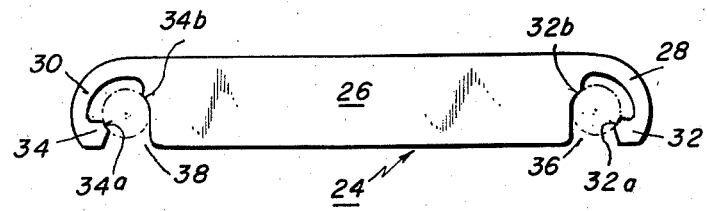
Fig. 1 is a front elevation of a retaining device according to the invention.

Rather than employing an open spring retaining ring seating in the groove 20 of each of the connector pins 14a, 14b according to a prior suggestion for solving the problem of securing said pins against axial separation from their links and/or link bars, the present invention proposes a single bar-type retaining device which is capable of securing both of said connector pins as aforesaid and, moreover, of being assembled on the pins simply by pressing the device over the pins from a side of the main link 10. Referring to Fig. 1, such a device which is generally designated 24 comprises an elongated bar-like body 26 of length corresponding substantially to that of the main links 10, from whose ends extend oppositely and downwardly curved spring arms 28, 30 which terminate in inwardly directed lug-like jaws 32, 34. The inner edges 32a, 34a of said jaws are struck on arcs of circles having like radius, which is slightly less than the radius of the circle of the bottom of the pin grooves 20, and said edges are each disposed diametrically opposite rigid arcuate edge portions 32b, 34b, respectively, formed on the ends of the bar body 26 to extend as arcs of the same circle as the jaw edges 32a, 34a which they face.

As also best seen in Fig. 1, the bar-body 26 of the herein retainer device is provided along one side edge and adjacent its ends with openings 36, 38 which communicate, respectively, with the jaw mouths or spaces defined by the edges 32a, 32b and 34a, 34b, respectively, and which are also spaced from one another a distance corresponding to the spacing of the connector pins 14a, 14b. Preferably, the effective width of the openings 36, 38 is slightly less than that of the diameter of the bottoms of the pin grooves 20, with the result that the jaws 32, 34 are sprung outwardly a small distance when the device is assembled on the two connector pins 14a, 14b of a main link 10. This latter feature, taken with the illustrated arrangement of the pairs of jaw edges 32a, 32b and 34a, 34b on diameters which are inclined downwardly-outwardly of the center lines of said side-edge openings 36, 38 of the retainer bar, as results in the edges 32a, 34a of the resilient jaws 32, 34 overhanging the rigid jaw edges 32b, 34b, insures that when a retaining device is once assembled on a pair of connector pins 14a, 14b said pins are firmly held by the spring action of the said jaws against said rigid jaw edges.

Figure 2:
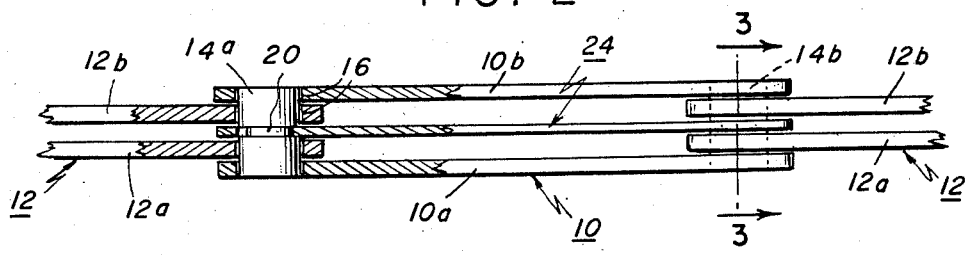
Fig. 2 is a partial section taken through a length of link chain illustrating the retaining device cooperated therewith and serving to secure two adjacent connector pins of the chain against axial separation from the link or link bars making up same.

From the above, it will be appreciated that chain links can be simply assembled and their connector pins secured by relating the main and connector links and the connector pins as illustrated in Fig. 2 and thereupon pressing the retainer device by hand or tool over the connector pins 14a, 14b while maintaining said device in the plane of the pin grooves 20. Such results in the jaws 32, 34 of the retaining device springing "over-center" of and engaging the bottoms of the grooves with the requisite spring pressure as to securely hold both of said pins against any axial separation movement with respect to the links and/or their link bars. It will be seen also that the bar-form of the retainer device as herein proposed makes the device exceedingly simple and easy to handle, as compared to the handling of two disconnected open retaining rings.

Figure 4:
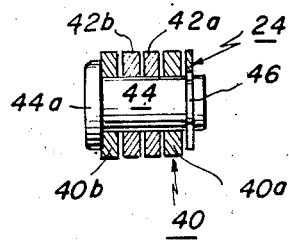
Fig. 4 is a section corresponding to Fig. 3 but illustrating a different type of link chain with which the retainer device of the present invention may be used.

A bar-type retaining device according to the invention may also be used to good effect with chain links whose link bars, rather than being integrally held together as are the bars of the main links 10, Figs. 2 and 3 are held together by connector pins corresponding to the aforesaid pins 14a, 14b but differing therefrom structurally. For example, and referring to Fig. 4, such represents a link chain whose main links 40 comprise separate outer link bars 40a, 40b which are secured to one another by connector pins 44 also serving to interconnect said main links with connecting links comprising separate link bars 42a, 42b corresponding to the previously described link bars 12a, 12b. The connector pins 44 employed in the modified link construction have a head 44a which secures the pins against axial movement with respect to links or link bars in one direction. To secure the pin against axial movement in the other axial direction, they are formed with grooves 46 corresponding to the aforesaid pin grooves 20 but positioned near the shank ends of the pins. To assemble the chain and secure the connector pins, the link and pin parts are related as in Fig. 4, and thereupon a retaining bar 24 identical in all respects to that previously described is positioned in the plane of the grooves 46 of two adjacent pins 44 and pressed into the said grooves. When so assembled, the retaining device in effect forms a shoulder on each of the shank ends of the pins which prevents axial movement of the links in the other direction.

While a retaining device as described achieves the desirable objectives therefor as outlined in the foregoing, it will be understood that many changes could be made in carrying out the above constructions without departing from the scope of the invention, and it is intended that all matter contained in the above description or shown in the accompanying drawing shall be interpreted as illustrative and not in a limiting sense.

I claim:

A retaining device for securing each two connector pins which pivotally connect the individual links of a link chain to adjacent links against axial displacement with respect to said links, said connector pins being each provided with a circular groove adapted to receive a retaining ring and the like and said grooves being disposed in a common plane, the device comprising an elongated bar-like body having length corresponding substantially to that of the individual links, the ends of the body being formed as spring arms extending oppositely from said body and terminating in inwardly directed resilient lugs having inner arcuate edges which are spaced from oppositely disposed arcuate edge portions provided on the rigid ends of the body proper, said inner arcuate edges and said arcuate edge portions extending along arcs of part-circular connector-pin receiving apertures of diameter substantially equaling the diameters of the groove bottoms and being disposed on diameter lines which are inclined towards one another with respect to the longitudinal center line of the body, said lugs also defining with the rigid end edges of the body proper entrance openings to said apertures of width slightly less than the diameter of the groove bottom and which extend from a side edge of the body to said apertures, said entrance openings and apertures being spaced a distance corresponding substantially to the spacing of the two connector pins, the construction and arrangement being such that the retaining device may be assembled to the two connector pins of an individual link by holding it to the side of said individual link and in the plane of the connector pin grooves and with its entrance openings facing the grooves, and thereupon pressing it towards said pins until the resilient lugs move over-center of and grip the groove bottoms against the associated rigid edges.

References Cited in the file of this patent

UNITED STATES PATENTS

| 571,978 | Myers | Nov. 24, 1896 |
| 881,493 | Schmidt | Mar. 10, 1908 |
| 2,623,399 | Barrett | Dec. 30, 1952 |

FOREIGN PATENTS

| 44 | Great Britain | AD Jan. 1, 1895 |